Patented Nov. 20, 1934

1,981,719

UNITED STATES PATENT OFFICE 1,981,719

HARD CEMENTED CARBIDE MATERIAL

Gregory J. Comstock, Edgewood, Pa., assignor to Firth-Sterling Steel Company, McKeesport, Pa., a corporation of Pennsylvania No Drawing. Application December 12, 1932, Serial No. 646,873

2 Claims. (Cl. 75—1)

This invention relates to the production of hard cemented carbide materials which are useful as cutting tools, wire drawing dies, and the like.

It is now known to make such materials by mixing a finely divided hard metal carbide such as tungsten carbide with a finely divided auxiliary metal such as cobalt, nickel or iron and then sintering the mixture at a temperature sufficient to cement or bond the carbide.

According to the present invention, alumina is incorporated with one or more hard metal carbides and one or more auxiliary metals before sintering. The alumina increases the cutting efficiency or wear resistance of the sintered or cemented composition.

In making the hard cemented composition, the alumina is ground with one or more hard metal carbides and one or more auxiliary metals such as cobalt, nickel or iron and the mixture is thereafter sintered or cemented either by first compacting and then applying heat, or by simultaneously applying heat and pressure to the mixed powders. Among the hard metal carbides to which the alumina may be added are tungsten carbide, chromium carbide, molybdenum carbide, vanadium carbide, titanium carbide, tantalum carbide, zirconium carbide, thorium carbide, uranium carbide, and columbium carbide.

An exceptionally good steel cutting material can be produced by sintering a mixture of tungsten carbide, tantalum carbide, alumina, and an auxiliary metal such as cobalt, nickel, or iron. There is very little tendency to form chip cavity or grooves on the tool, even though the tool be used at high speed and heavy feed.

A hard cemented carbide material containing tungsten carbide, tantalum carbide, alumina, and cobalt may be made as follows: These materials in powdered form are intimately mixed by milling them in a ball mill for from 24 to 48 hours. The percentages of the constituents may be varied within wide limits, depending upon the type of material which it is desired to produce. I have found that an excellent steel cutting material can be made from a powdered mixture containing about 48.7% tungsten carbide, 20.8% tantalum carbide, 18.8% alumina, and 11.7% cobalt. The mixed powder is then placed in a graphite mold which is heated electrically and the heat and pressure are applied simultaneously to the powder. The powder is heated to a temperature of about 3200° F. and a pressure of about 1400#/sq. in. is used throughout the heating operation and until the material has cooled to a dull red heat, after which the pressure is removed and the material is cooled further. The alumina may be in the form of commercially obtainable levigated alumina or in the form of sapphire, ruby, corundum, emery or alundum.

Although it is preferred to add the alumina in powdered form to the other powders which are to be used in forming the composition, it may be formed in other ways. Instead of mixing alumina with the abrasive and auxiliary metal, I may use metallic aluminum and sinter under such conditions as to produce alumina in the sintered material. Tungstic acid and aluminum may be added to the other finely divided constituents previous to final sintering instead of alumina and alumina may be produced according to the well known Goldschmidt method. The production of alumina under these conditions may result in the occurrence of either tungsten or tungsten carbide, depending upon the conditions under which sintering is conducted. Oxides of other metals such as chromium, molybdenum, vanadium, titanium, tantalum, zirconium, thorium, uranium, and columbium may similarly be mixed with aluminum so as to produce alumina. Similarly, the oxides of cobalt, nickel, and iron may be mixed with aluminum with the same end in view.

When mixtures of the type which has just been described containing alumina are sintered or cemented, aluminum or aluminum compounds or compounds or alloys containing either aluminum or alumina and the auxiliary metals iron, nickel, or cobalt, may be formed. Similarly, alloys containing either aluminum or alumina may be formed with such metals as are usually present in carbide form, namely, tungsten, chromium, molybdenum, vanadium, titanium, tantalum, zirconium, thorium, uranium, and columbium. Aluminum carbide may be formed.

I have described certain preferred methods of producing the hard cemented material. It is to be understood, however, that the invention may be otherwise embodied or practiced within the scope of the following claims.

I claim:

1. A hard cemented carbide material containing about 48% tungsten carbide, about 20% tantalum carbide, about 19% alumina, and about 12% of a metal of the group consisting of cobalt, nickel and iron.

2. A hard cemented carbide material containing about 48% tungsten carbide, about 20% tantalum carbide, about 19% alumina, and about 12% of cobalt.

GREGORY J. COMSTOCK.